(12) United States Patent
Harriton

(10) Patent No.: US 8,690,033 B2
(45) Date of Patent: Apr. 8, 2014

(54) TANK ASSEMBLY FOR ATTACHMENT TO A TIRE CARRIER

(75) Inventor: David Harriton, Missoula, MT (US)

(73) Assignee: Streetcar ORV LLC, Wixom, MI (US)

( * ) Notice: Subject to any disclaimer, the term of this patent is extended or adjusted under 35 U.S.C. 154(b) by 354 days.

(21) Appl. No.: 13/068,873

(22) Filed: Jul. 29, 2011

(65) Prior Publication Data

US 2013/0026199 A1     Jan. 31, 2013

(51) Int. Cl.
*B60R 9/06*     (2006.01)

(52) U.S. Cl.
USPC .......................................... 224/319; 224/42.13

(58) Field of Classification Search
USPC .............................................. 224/42.13, 319
See application file for complete search history.

(56) References Cited

U.S. PATENT DOCUMENTS

| | | | | |
|---|---|---|---|---|
| 1,421,050 A * | 6/1922 | Washington | ............... | 224/42.13 |
| 1,542,107 A * | 6/1925 | Sutherland | .................... | 224/484 |
| 2,946,598 A * | 7/1960 | Foster | .......................... | 280/830 |
| 2,951,671 A * | 9/1960 | Roehrig | ..................... | 248/311.2 |
| 3,595,422 A * | 7/1971 | Durrett et al. | ................ | 220/4.14 |
| 4,327,849 A * | 5/1982 | Sharpton | ........................ | 224/513 |
| 4,498,614 A * | 2/1985 | Guarr | ........................ | 224/42.13 |
| 4,911,343 A * | 3/1990 | Lords et al. | ................... | 224/511 |
| 4,993,610 A * | 2/1991 | Abretske et al. | ............. | 224/42.4 |
| 5,118,017 A * | 6/1992 | Buck | ........................... | 224/42.13 |
| 5,203,479 A * | 4/1993 | Lucas | ........................ | 224/42.13 |
| 5,228,608 A * | 7/1993 | Stout, III | ..................... | 224/42.13 |
| 5,344,038 A * | 9/1994 | Freeman et al. | .............| 220/62.22 |
| 5,358,157 A * | 10/1994 | Abretske | ........................ | 224/509 |
| 5,429,285 A * | 7/1995 | Kim | ........................... | 224/42.14 |
| 5,447,110 A * | 9/1995 | Brown | ............................ | 141/2 |
| 6,910,669 B2 * | 6/2005 | Gates et al. | ................... | 248/503 |
| 8,172,268 B2 * | 5/2012 | Komorida et al. | .............| 280/830 |
| 2008/0067200 A1 * | 3/2008 | Bernshtein | ................. | 224/42.13 |

FOREIGN PATENT DOCUMENTS

JP     09136674 A   *   5/1997

* cited by examiner

*Primary Examiner* — Nathan Newhouse
*Assistant Examiner* — John Cogill
(74) *Attorney, Agent, or Firm* — Quinn Law Group, PLLC

(57) ABSTRACT

A tank assembly is configured for attachment to a mount of a tire carrier of a vehicle. The tank assembly includes a hub reservoir and a flange reservoir. The hub reservoir radially surrounds a central axis and is configured for connection to, and being supported by, the mount of the tire carrier. The flange reservoir extends radially from the hub reservoir about the central axis. The hub reservoir and the flange reservoir cooperate to define a cavity which is configured for holding a volume of fluid.

15 Claims, 5 Drawing Sheets

TANK ASSEMBLY FOR ATTACHMENT TO A TIRE CARRIER

TECHNICAL FIELD

The invention relates to a tank assembly configured for attachment to a tire carrier of a vehicle.

BACKGROUND

Vehicles typically include a tire carrier for supporting a spare tire. Some vehicles include a tire carrier mounted to a back of the vehicle and the spare tire is mounted vertically on the tire carrier.

SUMMARY

A tank assembly is configured for attachment to a mount of a tire carrier of a vehicle. The tank assembly includes a hub reservoir and a flange reservoir. The hub reservoir radially surrounds a central axis and is configured for connection to, and being supported by, the mount of the tire carrier. The flange reservoir extends radially from the hub reservoir about the central axis. The hub reservoir and the flange reservoir cooperate to define a cavity which is configured for holding a volume of fluid.

A support assembly for a vehicle includes a tire carrier and a tank assembly. The tire carrier is configured for attachment to the vehicle. The tire carrier includes a support portion and a mount. The support portion extends between a first end and a second end. The support portion is configured for attachment to the vehicle, proximate the first end. The mount extends from the support portion between the first end and the second end. The tank assembly is operatively attached to the mount and the support portion of the tire carrier. The tank assembly includes a hub reservoir and a flange reservoir. The hub reservoir radially surrounds a central axis and is configured for connection to, and being supported by, the mount of the tire carrier. The flange reservoir extends radially from the hub reservoir about the central axis. The hub reservoir and the flange reservoir cooperate to define a cavity which is configured for holding a volume of fluid.

A vehicle includes a rear bumper, a tire carrier, and a tank assembly. The rear bumper is operatively attached to a rear of the vehicle. The tire carrier is attached to the rear bumper. The tire carrier includes a support portion and a mount. The support portion extends between a first end and a second end. The support portion is configured for attachment to the vehicle, proximate the first end. The mount extends from the support portion between the first end and the second end. The tank assembly includes a hub reservoir and a flange reservoir. The tank assembly is operatively attached to the mount and the support portion of the tire carrier. The hub reservoir radially surrounds a central axis and is configured for connection to, and being supported by, the mount of the tire carrier. The flange reservoir extends radially from the hub reservoir, about the central axis. The hub reservoir and the flange reservoir cooperate to define a cavity configured for holding a volume of fluid.

The above features and advantages and other features and advantages of the present invention are readily apparent from the following detailed description of the best modes for carrying out the invention when taken in connection with the accompanying drawings.

DETAILED DESCRIPTION

Figure 1:
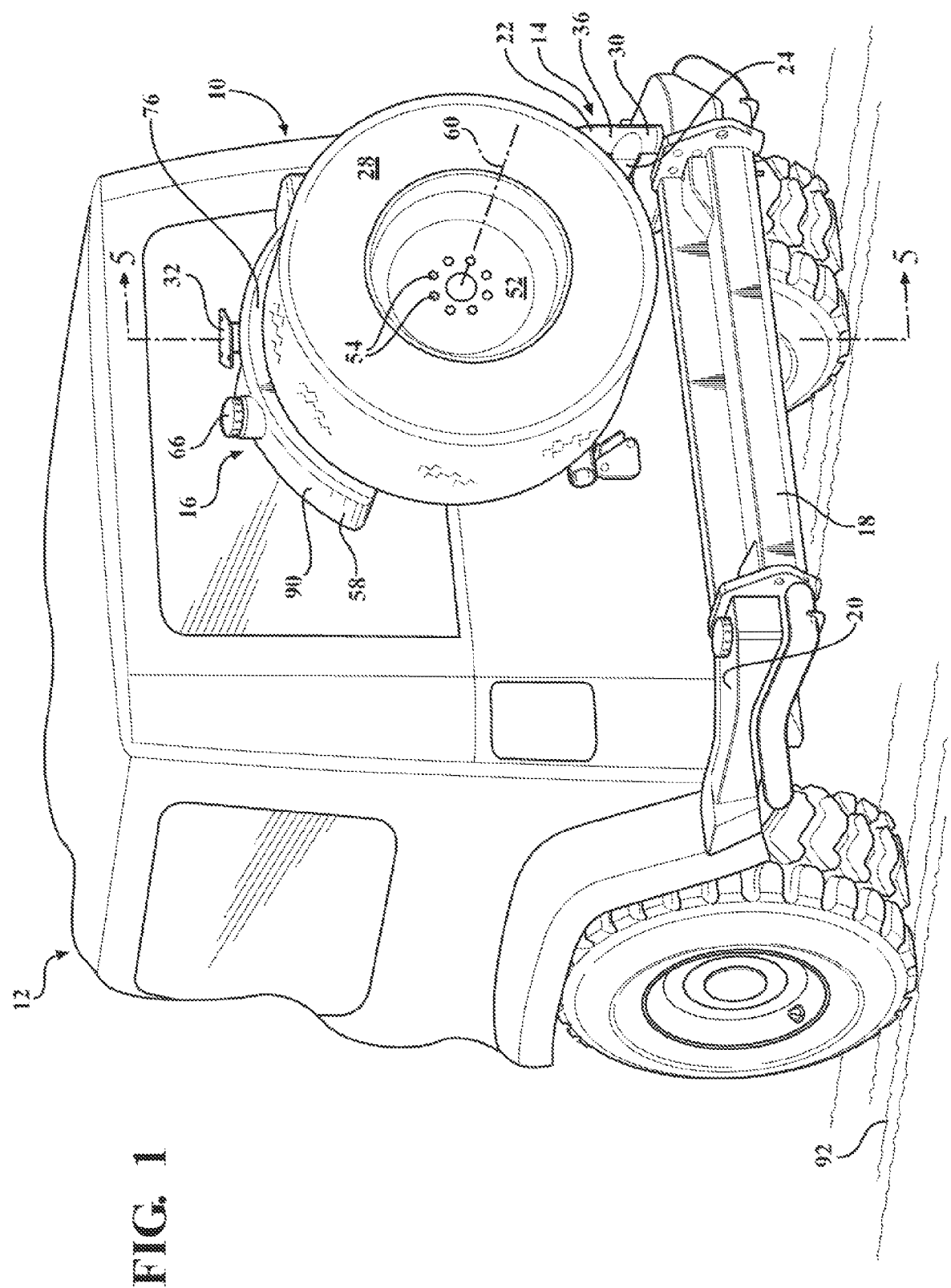
FIG. 1 is a partial rear perspective view of a vehicle having a rear bumper, a tire carrier, a tank assembly, and a spare tire mounted on the tire carrier.
Figure 2:
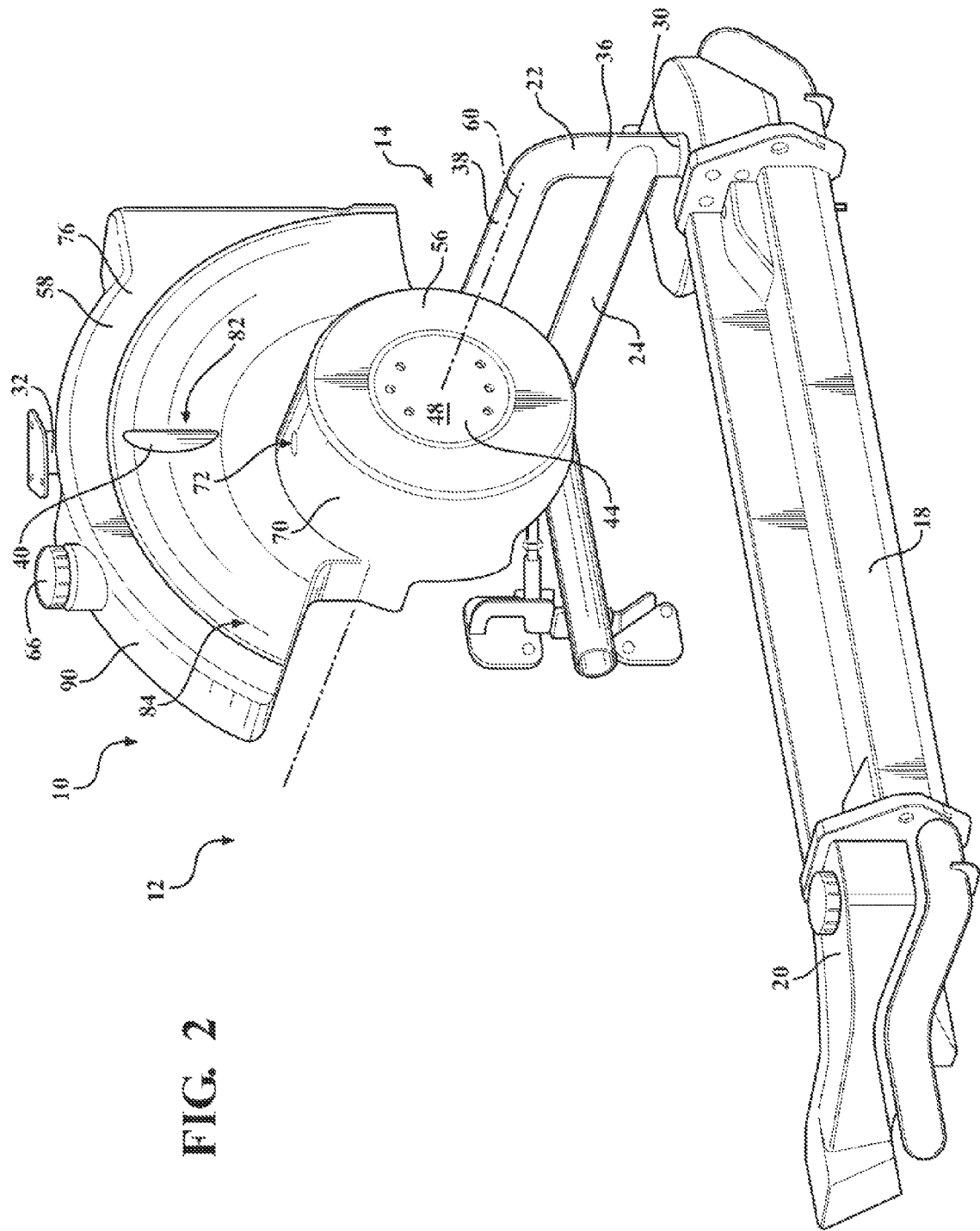
FIG. 2 is a rear perspective view of the rear bumper, the tire carrier, and the tank assembly.

Referring to the Figures, wherein like reference numerals refer to like elements, a support assembly 10 for a vehicle 12 is shown generally at 10 in FIGS. 1 and 2. The support assembly 10 includes a tire carrier 14 and a tank assembly 16. The tire carrier 14 is configured for attachment to a rear bumper 18 at a rear 20 of the vehicle 12 and includes a first support portion 22, a second support portion 24, and a mount 26. The tire carrier 14 is configured for supporting a spare tire 28 of the vehicle 12.

Figure 3:
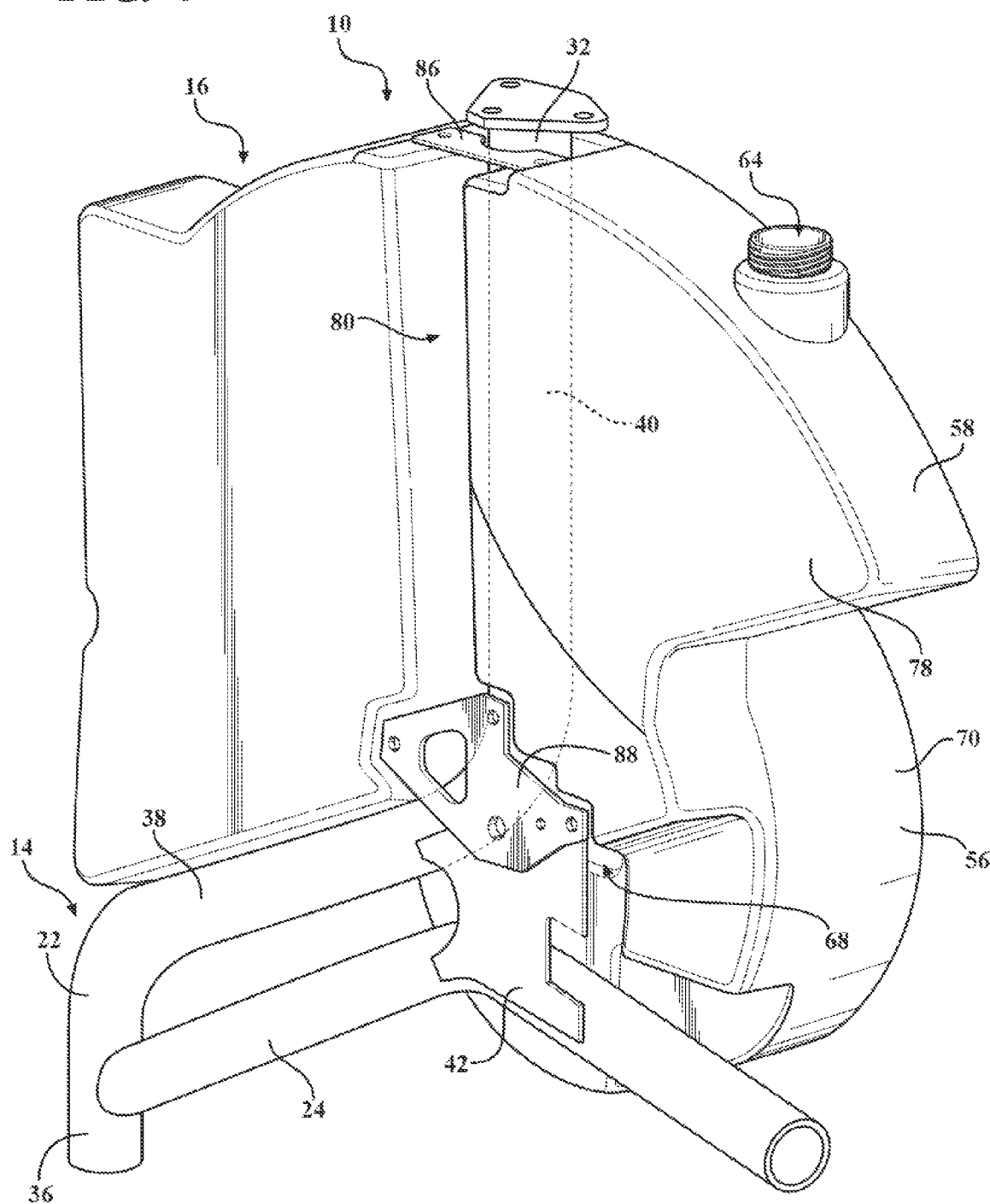
FIG. 3 is a partial front perspective view of the tank assembly attached to the tire carrier with a first bracket and a second bracket.
Figure 5:
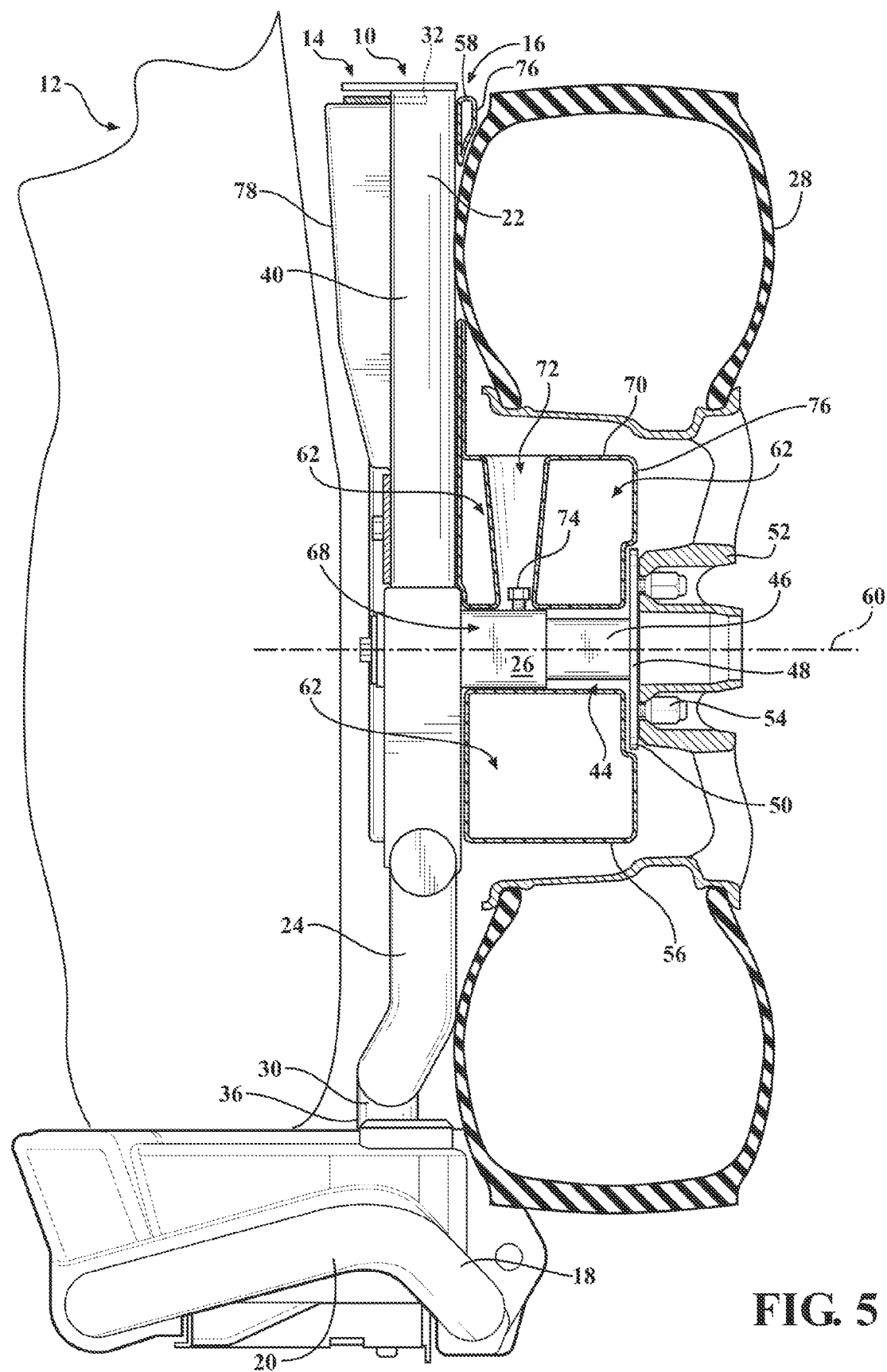
FIG. 5 is a partial cross-sectional side view of the rear bumper, the tire carrier, the tank assembly, and the spare tire, taken along line 5-5 of FIG. 1.

The first support portion 22 extends between a first end 30 and a second end 32 and is attached to the vehicle 12, proximate the first end 30, as shown in FIGS. 1-3 and 5. Referring to FIGS. 1, 2, and 5, the vehicle 12 includes a rear bumper 18 and the first support portion 22 is attached to the rear bumper 18. The first support portion 22 is generally S-shaped and includes a first member 36, a second member 38, and a third member 40. The first member 36 extends generally vertically from the rear bumper 18. The second member 38 extends from the first member 36 at an angle. The third member 40 extends from the second member 38 at another angle such that the third member 40 extends generally vertically. Therefore, the first member 36 and the third member 40 extend in spaced and generally parallel relationship to one another. The second support portion 24 extends from the first member 36 of the first support portion 22 at an angle such that the second support portion 24 and the second member 38 of the first support portion 22 extend in spaced and generally parallel relationship to one another. As shown in FIG. 3, an anchor bracket 42 is operatively connected to the second support portion 24 and the second member 38 of the first support portion 22.

Referring again to FIG. 5, the mount 26 extends generally perpendicularly from the anchor bracket 42, toward the rear 20 of the vehicle 12. An attachment portion 44 is removably attached to the mount 26. The attachment portion 44 includes an insert portion 46 and a mounting plate 48 extending from the insert portion 46. The insert portion 46 is configured to be inserted within the mount 26. The mounting plate 48 extends in generally perpendicular relationship to the attachment portion 44. At least one stud 50 extends from the mounting plate 48. The studs 50 extend through a rim 52 of the spare tire 28. The spare tire 28 is fastened to the mounting plate 48 of the attachment portion 44 via the studs 50 with a corresponding nut 54. With continued reference to FIG. 5, the tank assembly 16 is axially disposed along the central axis 20 between the mounting plate 48 of the attachment portion 44 and the first and second member 38, 40 of the tire carrier 14. Therefore, the tank assembly 16 is disposed over the mount 26 before the attachment portion 44 is attached to the mount 26.

The tank assembly 16 is operatively attached to the mount 26 and the anchor bracket 42 of the tire carrier 14. The tank assembly 16 includes a hub reservoir 56 and a flange reservoir 58. The hub reservoir 56 radially surrounds the central axis 60 and is configured for connection to, and being supported by, the mount 26 of the tire carrier 14. The flange reservoir 58 extends radially from the hub reservoir 56 about the central axis 60. The hub reservoir 56 and the flange reservoir 58 cooperate to define a cavity 62 that is configured for holding a volume of fluid. For example, the cavity 62 can hold a volume of fuel (e.g., gasoline and the like), water, etc. The flange reservoir 58 defines an opening 64 (FIG. 4) that is in fluid communication with the cavity 62. The opening 64 is configured for receiving and directing the fluid into the cavity 62. A cap 66 is removably attached to the flange reservoir 58 to cover and uncover the opening 64.

Figure 4:
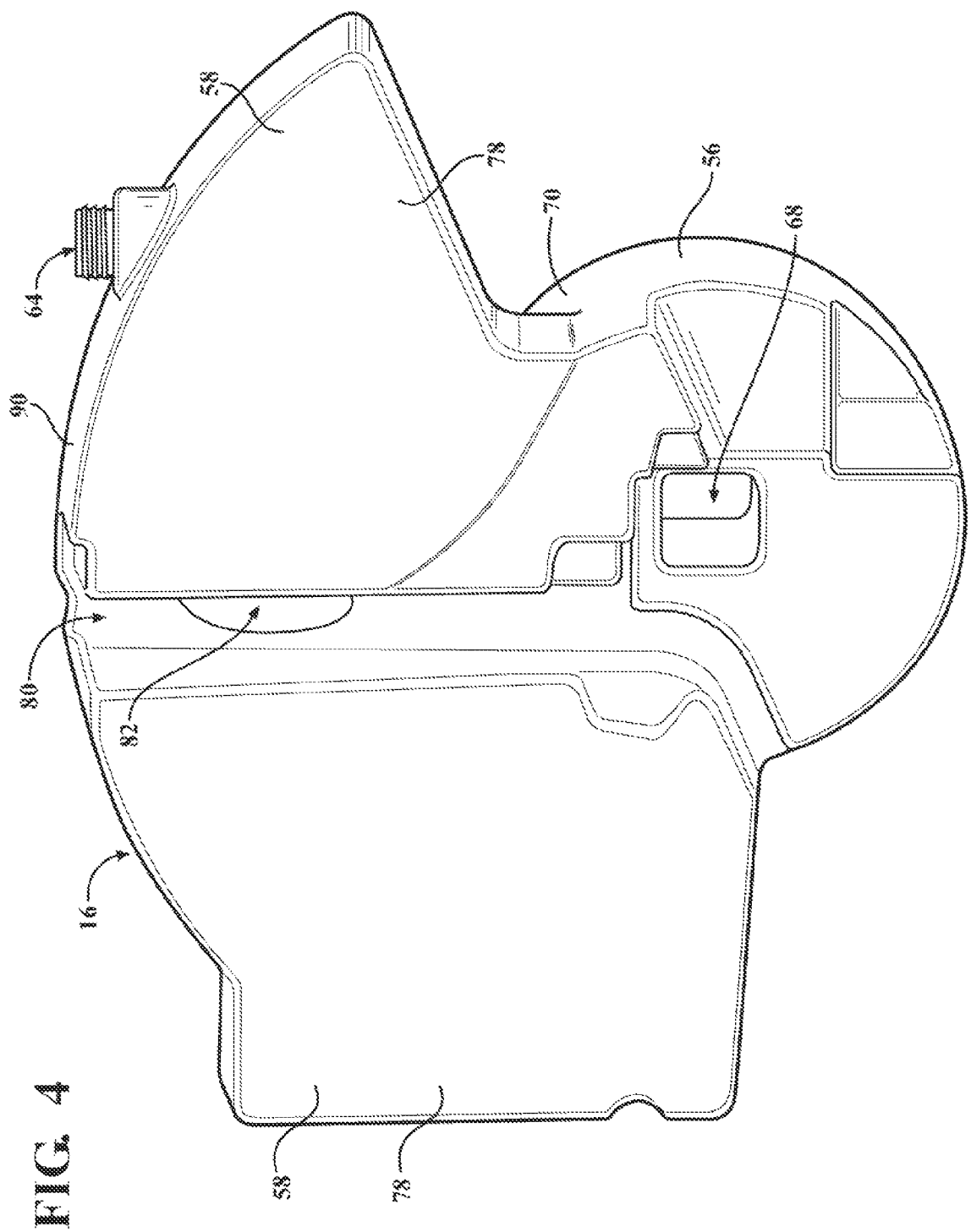
FIG. 4 is a front perspective view of the tank assembly.

Referring to FIGS. 4 and 5, the hub reservoir 56 defines a receiver hole 68 which extends along the central axis 60 and is complimentary to the mount 26 of the tire carrier 14. The receiver hole 68 is configured for receiving the mount 26 of the tire carrier 14 such that the hub reservoir 56 surrounds the mount 26 of the tire carrier 14 and the mount 26 at least partially supports the tank assembly 16 via the receiver hole 68 of the hub reservoir 56. The hub reservoir 56 extends axially along the central axis 60, beyond the flange reservoir 58. More specifically, the hub portion includes a wall 70 circumferentially surrounding the central axis 60 such that the hub portion is cylindrical. The wall 70 of the hub reservoir 56 is configured for fitting within the rim 52 of the spare tire 28. The hub reservoir 56 defines an access hole 72 which extends in generally perpendicular relationship to the central axis 60. More specifically, the access hole 72 extends from the wall 70 and opens to the receiver hole 68 such that the access hole 72 provides access to the mount 26 of the tire carrier 14 when the spare tire 28 is not mounted to the mounting plate 48. The receiver hole 68 may be square shaped. A set screw 74 is inserted into the mount 26 through the access hole 72 to retain the attachment portion 44 to the mount 26. The set screw 74 is only accessible when the spare tire 28 is removed from the vehicle 12. The attachment portion 44 is attached to the mount 26, but before the spare tire 28 is attached to the mounting plate 48.

The flange reservoir 58 and the hub reservoir 56 cooperate to present a first side 76 and a second side 78, opposing the first side 76. The first side 76 is configured interface with, or otherwise contact, the spare tire 28. The second side 78 defines a channel 80 which is configured for receiving a portion of the first support portion 22 of the tire carrier 14 therein. The first side 76 of flange reservoir 58 defines a thru-hole 82 opening to the channel 80. The thru-hole 82 is configured to allow contact between the portion of the tire carrier 14 received in the channel 80 and the spare tire 28, as shown in FIG. 5. The first side 76 of the flange reservoir 58 defines a groove 84 extending partially about the central axis 60 to form an arc shape. The thru-hole 82 is defined in the groove 84 of the flange reservoir 58. The groove 84 is configured for receiving a corresponding portion of the spare tire 28 when the spare tire 28 is attached to the mounting plate 48.

Referring again to FIG. 3, a first bracket 86 and a second bracket 88 may secure the tank assembly 16 to the tire carrier 14. More specifically, the flange reservoir 58 includes a top side 90, opposite the ground 92. The top side 90 interconnects the first side 76 and the second side 78 of the tank assembly 16. The second side 78 and the top side 90 cooperate to define the channel 80. The first support portion 22 extends through the channel 80 and out through the top side 90. The first bracket 86 is fastened, or otherwise attached, to the top side 90 of the tank assembly 16 such that the first support portion 22 is retained between the first bracket 86 and the tank assembly 16. The second bracket 88 operatively extends from the anchor bracket 42 and is fastened, or otherwise attached to the tank assembly 16 such that the first support portion 22 is also retained between the second bracket 88 and the tank assembly 16. Therefore, the first and second brackets 86, 88, the mount 26, and the mounting plate 48 of the attachment portion 44 cooperate to retain the tank assembly 16 to the tire carrier 14.

While the best modes for carrying out the invention have been described in detail, those familiar with the art to which this invention relates will recognize various alternative designs and embodiments for practicing the invention within the scope of the appended claims.

The invention claimed is:

1. A tank assembly configured for attachment to a mount of a tire carrier of a vehicle, the tank assembly comprising:
    a hub reservoir radially surrounding a central axis and configured for connection to, and being supported by, the mount of the tire carrier;
    wherein the hub reservoir defines a receiver hole extending along the central axis;
    a flange reservoir extending radially from the hub reservoir about the central axis;
    wherein the hub reservoir and the flange reservoir cooperate to define a cavity configured for holding a volume of fluid;
    wherein the receiver hole is complimentary to, and configured for receiving, the mount of the tire carrier such that the hub reservoir surrounds the mount of the tire carrier;
    wherein the hub reservoir includes a wall extending axially beyond the flange reservoir, along the central axis;
    wherein the wall circumferentially surrounds the central axis such that the hub reservoir is cylindrical;
    wherein the hub reservoir defines an access hole extending in generally perpendicular relationship to the central axis; and
    wherein the access hole extends through the wall and opens to the receiver hole such that access to the mount of the tire carrier is provided.

2. A tank assembly, as set forth in claim 1, wherein the flange reservoir and the hub reservoir cooperate to present a first side and a second side, opposing the first side;
    wherein the first side is configured for supporting the tire;
    wherein the second side defines a channel configured for receiving a portion of the tire carrier therein.

3. A tank assembly, as set forth in claim 2, wherein the first side of flange reservoir defines a thru-hole opening to the channel; wherein the thru-hole is configured to allow contact between the portion of the tire carrier received in the channel and the tire.

4. A tank assembly, as set forth in claim 3, wherein the first side of the flange reservoir defines a groove extending partially about the central axis to for an arc shape;
    wherein the thru-hole is defined in the groove of the flange reservoir; and
    wherein the groove is configured for receiving a corresponding portion of the tire.

5. A tank assembly, as set forth in claim 1, wherein the flange reservoir defines an opening in fluid communication with the cavity;
    wherein the opening is configured for receiving and directing the fluid into the cavity.

6. A tank assembly, as set forth in claim 1, wherein the wall of the hub reservoir is configured to be received in a rim of the spare tire.

7. A support assembly for a vehicle, the support assembly comprising:
    a tire carrier configured for attachment to the vehicle, the tire carrier including:
        a support portion extending between a first end and a second end;

wherein the support portion is configured for attachment to the vehicle, proximate the first end;

a mount extending from the support portion between the first end and the second end;

a tank assembly operatively attached to the mount and the support portion of the tire carrier, the tank assembly including:

a hub reservoir radially surrounding a central axis and configured for connection to, and being supported by, the mount of the tire carrier;

a flange reservoir extending radially from the hub reservoir about the central axis;

wherein the hub reservoir and the flange reservoir cooperate to define a cavity configured for holding a volume of fluid;

wherein the hub reservoir defines a receiver hole extending along the central axis;

wherein the receiver hole is complimentary to, and configured for receiving, the mount of the tire carrier such that the hub reservoir surrounds the mount of the tire carrier;

wherein the hub reservoir includes a wall extending axially beyond the flange reservoir, along the central axis;

wherein the wall circumferentially surrounds the central axis such that the hub reservoir is cylindrical;

wherein the hub reservoir defines an access hole extending in generally perpendicular relationship to the central axis; and wherein the access hole extends through the wall and opens to the receiver hole such that access to the mount of the tire carrier is provided.

8. A support assembly, as set forth in claim 7, wherein the flange reservoir and the hub reservoir cooperate to present a first side and a second side, opposing the first side;

wherein the first side is configured for supporting a spare tire;

wherein the second side defines a channel and a portion of the support portion is disposed in the channel.

9. A support assembly, as set forth in claim 8, wherein the first side of flange reservoir defines a thru-hole opening to the channel;

wherein the thru-hole is configured to allow contact between the portion of the tire carrier received in the channel and the spare tire.

10. A support assembly, as set forth in claim 9, wherein the first side of the flange reservoir defines a groove extending partially about the central axis to form an arc shape;

wherein the thru-hole is defined in the groove of the flange reservoir; and wherein the groove is configured for receiving a corresponding portion of the spare tire.

11. A support assembly, as set forth in claim 8, further comprising a first bracket;

wherein the flange reservoir further includes a top side extending between the first side and the second side;

wherein the top side and the second side cooperate to define the channel and the support portion extends through the top side;

wherein the first bracket is attached to the top side such that the support portion is retained between the first bracket and the tank assembly.

12. A support assembly, as set forth in claim 7, wherein the wall of the hub reservoir is configured to be received within a rim of a spare tire.

13. A support assembly, as set forth in claim 12, wherein the tire carrier further includes an attachment portion having:

an insert portion inserted within the mount; and a mounting plate attached to the insert portion in generally perpendicular relationship;

wherein the mounting plate is configured for supporting the rim of the spare tire.

14. A support assembly, as set forth in claim 7, wherein the flange reservoir defines an opening in fluid communication with the cavity;

wherein the opening is configured for receiving and directing the fluid into the cavity.

15. A vehicle comprising:

a rear bumper operatively attached to a rear of the vehicle;

a tire carrier attached to the rear bumper, the tire carrier including:

a support portion extending between a first end and a second end;

wherein the support portion is configured for attachment to the vehicle, proximate the first end;

a mount extending from the support portion between the first end and the second end;

a tank assembly operatively attached to the mount and the support portion of the tire carrier, the tank assembly including:

a hub reservoir radially surrounding a central axis and configured for connection to, and being supported by, the mount of the tire carrier;

a flange reservoir extending radially from the hub reservoir about the central axis;

wherein the hub reservoir and the flange reservoir cooperate to define a cavity configured for holding a volume of fluid;

wherein the hub reservoir defines a receiver hole extending along the central axis;

wherein the receiver hole is complimentary to, and receives, the mount of the tire carrier such that the hub reservoir surrounds the mount of the tire carrier;

wherein the hub portion includes a wall extending axially beyond the flange reservoir portion, along the central axis;

wherein the wall circumferentially surrounds the central axis such that the hub portion is cylindrical;

wherein the hub portion defines an access hole extending in generally perpendicular relationship to the central axis; and wherein the access hole extends through the wall and opens to the receiver hole such that access to the mount of the tire carrier is provided.

* * * * *